April 23, 1968 L. R. KIRKWOOD ET AL 3,379,924
TELEVISION DEFLECTION CIRCUITS
Filed April 26, 1965
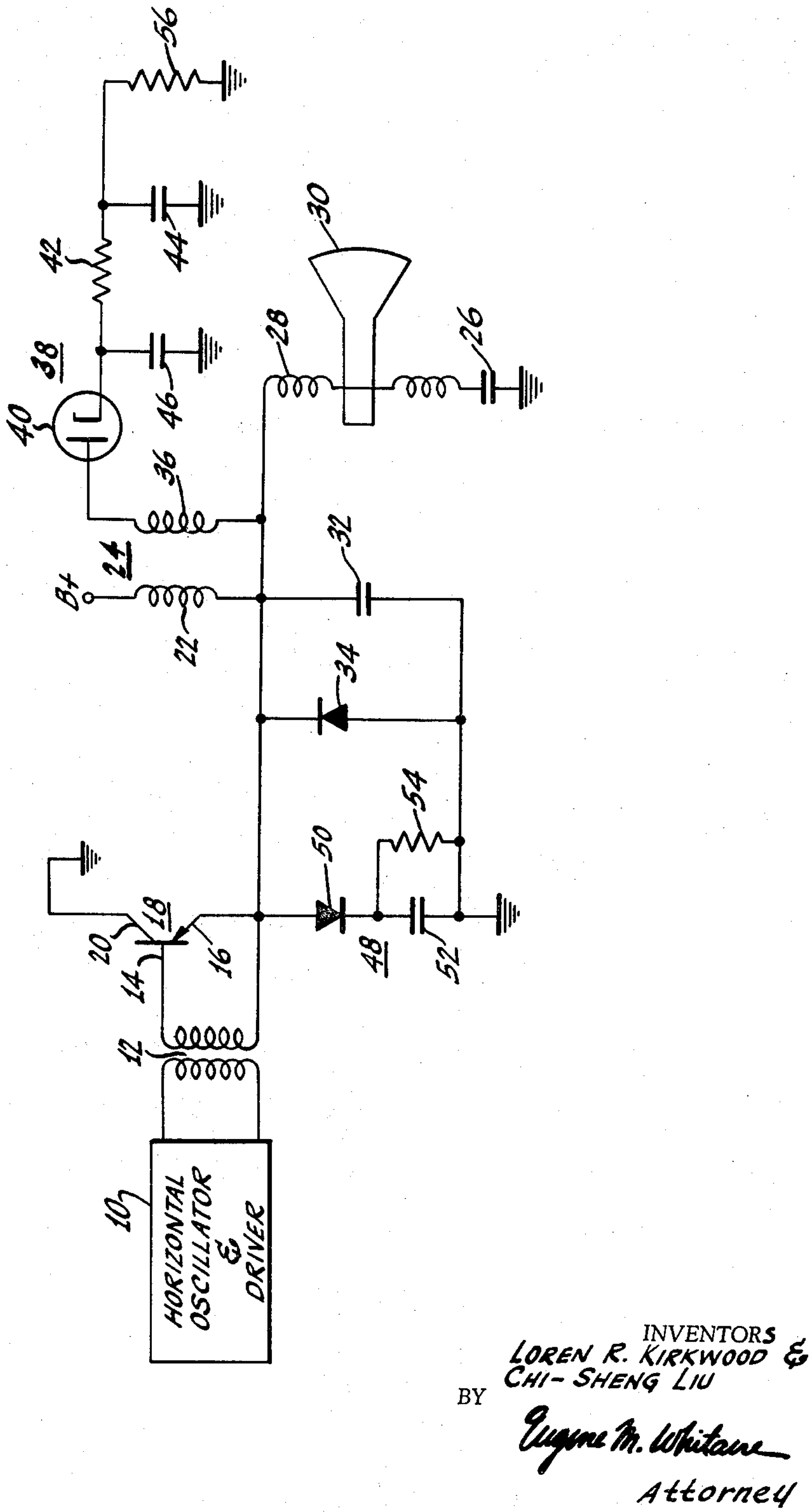
INVENTORS
LOREN R. KIRKWOOD &
CHI-SHENG LIU
BY
Eugene M. Whitacre
Attorney United States Patent Office 3,379,924

Patented Apr. 23, 1968

3,379,924

TELEVISION DEFLECTION CIRCUITS

Loren R. Kirkwood and Chi-sheng Liu, Indianapolis, Ind., assignors to Radio Corporation of America, a corporation of Delaware Filed Apr. 26, 1965, Ser. No. 450,894
6 Claims. (Cl. 315—22)

This invention relates to television deflection circuits and in particular to transistor horizontal deflection circuits which include a high voltage circuit for producing the high direct accelerating voltage required for operation of the kinescope in a television receiver.

One of the major problems encountered in such transistor deflection circuits relates to protecting the horizontal output transistor against high energy transients which accompany undesired arcing in the high voltage circuit. The high voltage circuit normally includes a step-up flyback transformer for developing high voltage pulses during the retrace portion of a horizontal deflection cycle. The high voltage circuit further includes the combination of a high voltage rectifier and a filter capacitor, the combination being coupled to the flyback transformer for producing from the high voltage pulses the desired high direct voltage. In accordance with present television receiver design practice, the high voltage filter capacitor advantageously may constitute the capacitance between the inner conductive coating (aquadag) and the outer conductive coating of the kinescope, the latter conductive coating being coupled to chassis ground. In a circuit of the type described, undesirable arcing may occur within the high voltage rectifier during the trace portion of a scanning cycle, a time at which the high voltage rectifier normally is reverse biased by a voltage exceeding the full high voltage (e.g., 13,000 volts) which appears across the filter capacitor. Such arcing may occur as a result of flaking of cathode matrial in the high voltage rectifier or, for example, as a result of "whiskers" growing between the anode and cathode of the rectifier. In any case, upon arcing, the energy stored in the high voltage capacitor is fed back abruptly via the high voltage transformer to the horizontal deflection output transistor.

While such arcing is undesirable in any television receiver, it is of particular concern in connection with transistor television receivers since transistors are, in general, unable to withstand high energy surges without failure.

It is, accordingly, an object of the present invention to provide an improved combined horizontal deflection and high voltage supply circuit for television receivers wherein the effects upon the horizontal output amplifier of high energy transients in the high voltage supply are substantially reduced.

It is another object of this invention to provide circuit means for protecting a transistor horizontal deflection circuit against failure caused by high energy transients in an associtated high voltage supply.

It is another object of this invention to provide circuit means for protecting a transistor horizontal deflection circuit against failure caused by arcing in an associated high voltage rectifier during the trace portion of a deflection cycle.

In accordance with the invention, a transistor deflection and high voltage supply circuit includes a step-up flyback transformer coupled in circuit with a horizontal output transistor amplifier for providing high voltage retrace pulses to a rectifier-filter capacitor combination. A second capacitor having a substantially smaller capacitance than the filter capacitor is connected directly between the cathode of the rectifier and ground while a relatively large current limiting resistor is connected in series from the junction of the second capacitor and the rectifier to the high voltage terminal of the filter capacitor.

The noval features that are considered characteristic of this invention are set forth with particularity in the appended claims. The invention itself, however, both as to its organization and method of operation, as well as additional objects and advantages thereof, will best be understood from the following description when read in connection with the accompanying drawing in which the sole figure is a schematic circuit diagram of a portion of a transistor horizontal deflection circuit including a high voltage supply circuit for a television receiver embodying the present invention.

Referring to the drawing, a transistor horizontal deflection and high voltage supply circuit comprises a suitably synchronized horizontal oscillator and driver circuit 10 which may, for example, include a suitable blocking oscillator for generating voltage pulses at the television horizontal scanning frequency (e.g. 15,750 cycles per second). Amplified voltage pulses are coupled by means of a transformer 12 to the input terminals, i.e. base 14 and emitter 16, of a horizontal output transistor 18. The collector 20 of transistor 18 is connected to a point of fixed reference potential such as chassis ground. The emitter 16 is coupled to a voltage supply (B+) by means of the primary winding 22 of a flyback transformer 24. The series combination of an S-shaping capacitor 26 and a horizontal deflection yoke 28 associated with an image-reproducing kinescope 30 is coupled between emitter 16 and collector 20 of transistor 18. A retrace capacitor 32 and a damper diode 34 each are coupled between emitted 16 and collector 20. Flyback transformer 24 includes a secondary voltage step-up winding 36 to which a high voltage generating circuit 38 is coupled. High voltage circuit 38 includes the series combination of a high voltage rectifier 40, current limiting resistor 42 and a high voltage filter capacitor 44 coupled in the order named between one terminal of secondary winding 36 and ground. The other terminal of secondary winding 36 is coupled to emitter 16. A resistor 56, representative of the variyng resistive load of kinescope 30 on high voltage circuit 38 is coupled across capacitor 44. Filter capacitor 44 advantageously consists of the capacitance between the internal conductive coating (aquadag) of kinescope 30 and chassis ground. The high voltage circuit 38 further comprises a second capacitor 46 connected from the junction of the cathode of rectifier 40 and limiting resistor 42 to ground. The capacitance of capacitor 46 is substantially less than (e.g. one twenty-fifth) the capacitance of filter capacitor 44. A unidirectionally conductive voltage clamping circuit 48 comprising a diode 50 coupled in series with the parallel combination of a storage capacitor 52 and an energy dissipating resistor 54 is also coupled between emitter 16 and collector 20.

In operation, drive pulses recurring at the horizontal or line scanning frequency are applied from horizontal oscillator and driver circuit 10 via transformer 12 to the base 14 of horizontal output transistor 18. Stated simply, the drive pulses serve to switch the transistor 18 from "on" or conductive condition at a time during the trace portion of the deflection cycle to an "off" or substantially non-conductive condition during the retrace portion of the deflection cycle. A complete horizontal deflection cycle will be described commencing in the vicinity of the beginning of the retrace portion of the cycle. Immediately prior to the initiation of retrace the current flowing through deflection yoke 28 is supplied by transistor 18. At that time, the yoke current reaches a miximum value in one direction such that the electron beam produced in kinescope 30 is deflected to one extreme edge of the screen thereof. Furthermore, at that time, a relatively small voltage exists between emitter 16 and collector 20 of transistor 18 and therefore appears across each of the circuits connected between those terminals (e.g. diode 34, capacitor 32, the combination of yoke 28 and capacitor 26, etc.). Upon application of a drive pulse to base 14, transistor 18 is driven rapidly to a non-conductive state. The relatively large current flowing through yoke 28 at the end of trace then flows into retrace capacitor 32. Capacitor 32, yoke 28 and additional circuit reactances inherent in the transformer 24 are proportioned such that the current and voltage associated with yoke 28 oscillate though slightly in excess of one-half cycle during the retrace portion of the deflection cycle. During retrace, therefore, the current through deflection yoke 28 reverses in direction so as to deflect the electron beam produced in kinescope 30 to the opposite edge of the screen thereof. The peak voltage which is produced across the primary winding 22 of flyback transformer 24 during retrace is related to the relative durations of the trace and retrace portions of the deflection cycle and to the supply voltage B+. The flyback or retrace voltage pulse is stepped-up by means of transformer 24 and is applied to high voltage rectifier 40. The stepped-up flyback voltage pulse is rectified and filtered by means of rectifier 40 and the filter circuit comprising capacitor 46, resistor 42 and capacitor 44, respectively, to produce at the high voltage terminal of capacitor 44 a voltage of, for example, 13,000 volts.

At the end of retrace, the voltage across capacitor 32 and therefore the voltage across diode 34 is of such a polarity and the current flowing in yoke 26 is in such a direction that substantially all of the linearly increasing yoke current passes through diode 34 in the forward direction. Diode 34 continues to pass substantially all of the yoke current during the initial portion of the deflection cycle while a relatively insignificant portion of the yoke current flows in the reverse direction through the substantially nonconductive transistor 18. The yoke current increases in the positive direction (i.e., decreases towards zero from a negative value) and eventually passes through zero whereupon diode 34 ceases conduction while transistor 18 conducts in the forward direction to supply the linearly increasing yoke current for the remaining portion of the deflection cycle. At the end of the trace portion of the deflection cycle, a drive pulse is again applied to the base 14 of transistor 18 and the deflection cycle is repeated.

The present invention provides protection for transistor 18 against the condition which is produced when high voltage rectifier 40 is rendered conductive while subjected to a high reverse voltage (e.g. during any part of the trace portion of a deflection cycle). Such an abnormal condition exists when spurious internal arcing takes place within high voltage rectifier 40 as a result, for example, of flaking of the cathode material in the rectifier 40.

In a circuit configuration of the type illustrated, the capacitor 44 may be of the order of 500 picofarads while the voltage produced across that capacitor may be of the order of 13,000 volts. In that case, capacitor 44 stores approximately 45 millijoules of energy. In the absence of capacitor 46 and resistor 42, such stored energy may approach 50 millijoules. In the latter case, if the high voltage rectifier 40 arcs during trace, the 50 millijoules of energy stored in capacitor 44 would be fed back via transformer 24 into the deflection circuit in a relatively short time interval. The abrupt surge of energy (high current, high voltage), several times greater than the allowable dissipation of transistor 18, would destroy transistor 18.

In accordance with the present invention, capacitor 46 and resistor 42 are provided to substantially lessen the effect upon transistor 18 of internal arcing in rectifier 40, thereby substantially increasing the service life of the deflection circuit. Resistor 42 serves, upon the occurrence of arcing in rectifier 40, to decrease the current which flows in high voltage circuit 38 and to dissipate within circuit 38 at least a portion of the energy which otherwise would be fed back to transistor 18. The resistance value of resistor 42 is selected sufficiently large so that transistor 18 is not destroyed upon the occurrence of such arcing. The value of resistor 42 is limited in practice in that, in order to prevent a noticeable decrease in high voltage, resistor 42 should be substantially less than the resistor 56. In a typical circuit, with a high voltage of 13,000 volts and a kinescope beam current of 200 microamperes resistor 56 would be 65 megohms. A resistor 42 of 2 megohms would be suitable in that case.

The addition of resistor 42 by itself would, however, seriously affect the regulation of the high voltage produced across capacitor 44. Since, under normal operating conditions, rectifier 40 is only rendered conductive during a relatively small portion of the retrace interval of each deflection cycle, it is desirable that the charging time constant of capacitor 44 be as short as possible to maintain the high voltage substantially constant. A large resistor 42 by itself substantially increases that charging time constant and thereby adversely affects high voltage regulation. Therefore, in accordance with the present invention, capacitor 46 having a capacitive value and hence an energy storage capability substantially lower than capacitor 44, is connected between the cathode of rectifier 40 and ground. Upon arcing in rectifier 40, the energy stored in capacitor 46 is fed back via transformer 24 to transistor 18. However, capacitor 46 is selected such that the energy stored therein is insufficient to destroy transistor 18. For example, capacitor 46 may be of the order of 20 picofarads and therefore store approximately 2 millijoules of energy in the illustrated circuit.

Under normal operating conditions, capacitor 46 charges rapidly via rectifier 40 during the small conductive portion of the retrace interval and, after rectifier 40 opens (i.e. the plate voltage falls below the cathode voltage), capacitor 46 charges capacitor 44 via resistor 42 until equilibrium is reached, thereby maintaining the regulation of the high voltage.

A circuit constructed in accordance with the present invention therefore provides the desired protection for transistor 18 without seriously affecting regulations of the high voltage supply 38.

A typical embodiment of the invention such as is shown in the drawing includes the following components:

| | | |
|---|---|---|
| B+ voltage supply | volts | 30 |
| Transistor 18 | | RCA Type TA 1928A |
| Diode 50 | | RCA Type TA 1115 |
| Yoke 28 | microhenries | 200 |
| Capacitor 26 | microfarads | 3.5 |
| Capacitor 32 | do | 0.05 |
| Capacitor 44 | picofarads | 500 |
| Capacitor 46 | do | 20 |
| Capacitor 52 | microfarads | 0.02 |
| Resistor 42 | megohms | 2.0 |
| Resistor 54 | ohms | 220,000 |

What is claimed is:

1. In a television receiver, a horizontal deflection and high voltage supply circuit for an image reproducing device, comprising:

a horizontal deflection winding, switching means coupled to said deflection winding to provide a substantially linearly increasing deflection current flow through said winding during the trace portion of the horizontal deflection cycle of the receiver, a high voltage transformer coupled to said switching means for developing high voltage pulses during the retrace portion of the horizontal deflection cycle, high voltage supply means including a rectifier and a filter capacitor coupled in series relation across said transformer and responsive to said high voltage pulses for developing a high direct voltage, said high voltage supply means further including a current limiting means connected in series between said rectifier and said filter capacitor and a second capacitor of substantially smaller capacitance than said filter capacitor coupled from the junction of said rectifier and said current limiting means to said transformer, whereby upon the occurrence of undesired arcing in said rectifier, the relatively low energy stored in said second capacitor discharges rapidly through said transformer while the relatively high energy stored in said filter capacitor is partially dissipated and discharges slowly through said transformer.

2. In a television receiver, a horizontal deflection and high voltage supply circuit for an image reproducing device, comprising:

a horizontal deflection winding, switching means coupled to said deflection winding to provide a substantially linearly increasing deflection current flow through said winding during the trace portion of the horizontal deflection cycle of the receiver, a high voltage transformer coupled to said switching means for developing high voltage pulses during the retrace portion of the horizontal deflection cycle, high voltage supply means including a rectifier, a current limiting resistor coupled to said rectifier and a filter capacitor coupled to said resistor, said supply means being coupled to said transformer and being responsive to said high voltage pulses for developing a high direct voltage, and a second capacitor of substantially smaller capacitance than said filter capacitor coupled from the junction of said rectifier and said resistor to said transformer, whereby upon the occurrence of undesired arcing in said rectifier, the relatively low energy stored in said second capacitor discharges rapidly through said transformer while the relatively high energy stored in said filter capacitor is partially dissipated and discharges slowly through said transformer.

3. In a transistor television receiver the combination of a transistor horizontal deflection circuit, a high voltage transformer having a primary winding coupled to said deflection circuit and a secondary winding inductively coupled to said primary winding, a high voltage rectifier coupled to said secondary winding, a high voltage filter capacitor coupled to said rectifier for developing a high direct voltage, a current limiting resistor connected in series between said rectifier and said filter capacitor, and a second capacitor coupled from the junction of said rectifier and said resistor to a terminal of said secondary winding remote from said rectifier, the capacitance of said second capacitor being selected substantially smaller than the capacitance of said filter capacitor, whereby upon the occurrence of undesired arcing in said rectifier, the relatively low energy in said second capacitor discharges rapidly through said transformer while the relatively high energy stored in said filter capacitor is partially dissipated and discharges slowly through said transformer.

4. In a transistor television receiver the combination of a transistor horizontal deflection circuit including a horizontal output transistor and the parallel combination of a deflection winding and a retrace capacitor coupled to said output transistor, a high voltage transformer having a primary winding coupled to said deflection circuit and a secondary winding inductively coupled to said primary winding, a high voltage rectifier coupled to said secondary winding, a high voltage filter capacitor coupled to said rectifier for developing a high direct voltage, a current limiting resistor connected in series between said rectifier and said filter capacitor, a second capacitor coupled from the junction of said rectifier and said resistor to a terminal of said secondary winding remote from said rectifier, the capacitance of said second capacitor being selected substantially smaller than the capacitance of said filter capacitor, whereby upon the occurrence of undesired arcing in said rectifier, the relatively low energy stored in said second capacitor discharges rapidly through said transformer while the relatively high energy stored in said filter capacitor is partially dissipated and discharges slowly through said transformer.

5. In a television receiver including an image reproducing kinescope and a high voltage supply coupled to said kinescope, the kinescope presenting to the high voltage supply a load comprising the parallel combination of a relatively fixed capacitance and a varying resistance, the combination of a transistor horizontal deflection circuit including a horizontal output transistor and the parallel combination of a deflection winding and a retrace capacitor coupled to said output transistor, a high voltage transformer having a low voltage winding coupled to said deflection circuit and a high voltage winding inductively coupled to said low voltage winding, a high voltage rectifier coupled to said high voltage winding, a current limiting resistor connected in series between said rectifier and said capacitance of said kinescope, a second capacitor of substantially smaller capacitance than said kinescope capacitance coupled from the junction of said rectifier and said resistor to said high voltage winding at a point remote from said rectifier, whereby upon the occurrence of undesired arcing in said rectifier, a relatively low stored energy in said second capacitor discharges rapidly through said transformer while a relatively high stored energy in said kinescope capacitance is partially dissipated in said resistor, the remainder discharging slowly through said transformer.

6. In a television receiver including an image reproducing kinescope having a high voltage electrode and a high voltage supply coupled to said high voltage electrode, the kinescope presenting to the high voltage supply a load comprising the parallel combination of a relatively fixed capacitance and a varying resistance coupled between said electrode and a reference voltage terminal, the resistance being determined by the voltage supplied by said high voltage supply to said kinescope and by the electron beam current produced in said kinescope, the combination of a transistor horizontal deflection circuit including a horizontal output transistor and the parallel combination of a deflection winding and a retrace capacitor coupled to said output transistor, a high voltage transformer having a low voltage winding coupled to said deflection circuit and a high voltage winding inductively coupled to said low voltage winding, a high voltage rectifier coupled to said high voltage winding, a current limiting resistor connected in series between said rectifier and said high voltage electrode, the resistance of said resistor being substantially less than said kinescope resistance, a second capacitor of substantially smaller capacitance than said kinescope capacitance coupled from the junction of said rectifier and said resistor to said reference voltage terminal, whereby upon the occurrence of undesired arcing in said rectifier, a relatively low stored energy in said second capacitor discharges rapidly through said transformer while a relatively high stored energy in said kinescope capacitance is partially dissipated in said resistor, the remainder discharging slowly through said transformer.

References Cited

UNITED STATES PATENTS 3,302,056 1/1967 Preisig ---------------- 315—27

RODNEY D. BENNETT, *Primary Examiner.*

T. H. TUBBESING, *Assistant Examiner.*